United States Patent [19]

Pellon

[11] Patent Number: 5,274,386
[45] Date of Patent: Dec. 28, 1993

[54] REDUCED HARDWARE ANTENNA BEAMFORMER

[75] Inventor: Leopold E. Pellon, Mt. Holly, N.J.

[73] Assignee: General Electric Co., Moorestown, N.J.

[21] Appl. No.: 900,826

[22] Filed: Jun. 17, 1992

[51] Int. Cl.$^5$ .............................................. G01S 3/16
[52] U.S. Cl. .................................. 342/380; 342/379; 342/383
[58] Field of Search .............. 342/379, 380, 382, 383, 342/194, 373

[56] References Cited

U.S. PATENT DOCUMENTS

| | | | |
|---|---|---|---|
| 4,577,193 | 3/1986 | Kiuchi et al. ...................... | 342/380 |
| 4,720,712 | 1/1988 | Brookner et al. .................... | 342/383 |
| 4,734,701 | 3/1988 | Grobert ................................ | 342/380 |
| 4,779,054 | 10/1988 | Monteleone et al. ................. | 329/50 |

*Primary Examiner*—Gregory C. Issing
*Attorney, Agent, or Firm*—William H. Meise; Carlos A. Nieves; Stephen A. Young

[57] ABSTRACT

A beamformer for a main antenna and a plurality of auxiliary antennas converts the main and each of the auxiliary signals to digital form. Each of the real and auxiliary digital signals is applied to a pair of real multipliers, in which multiplication by beamforming weights is performed, to produce one weighted real main signal, one weighted imaginary main signal, and a plurality of weighted real and weighted imaginary auxiliary signals. The weighted real main and auxiliary signals are summed together by a cascade of summers, and the weighted imaginary main and auxiliary signals are likewise summed together by another summed cascade. A digital product detector is connected to the output of each summer cascade. The first digital product detector produces in-phase and quadrature components of real detected signals, and the second digital product detector produces in-phase and quadrature components of imaginary detected signals. The quadrature imaginary detected signals are subtracted from the in-phase real detected signals, and the in-phase imaginary detected signals are added to the quadrature real detected signals, to produce signals corresponding to the signals received by the main antenna with reduced sidelobes.

2 Claims, 4 Drawing Sheets

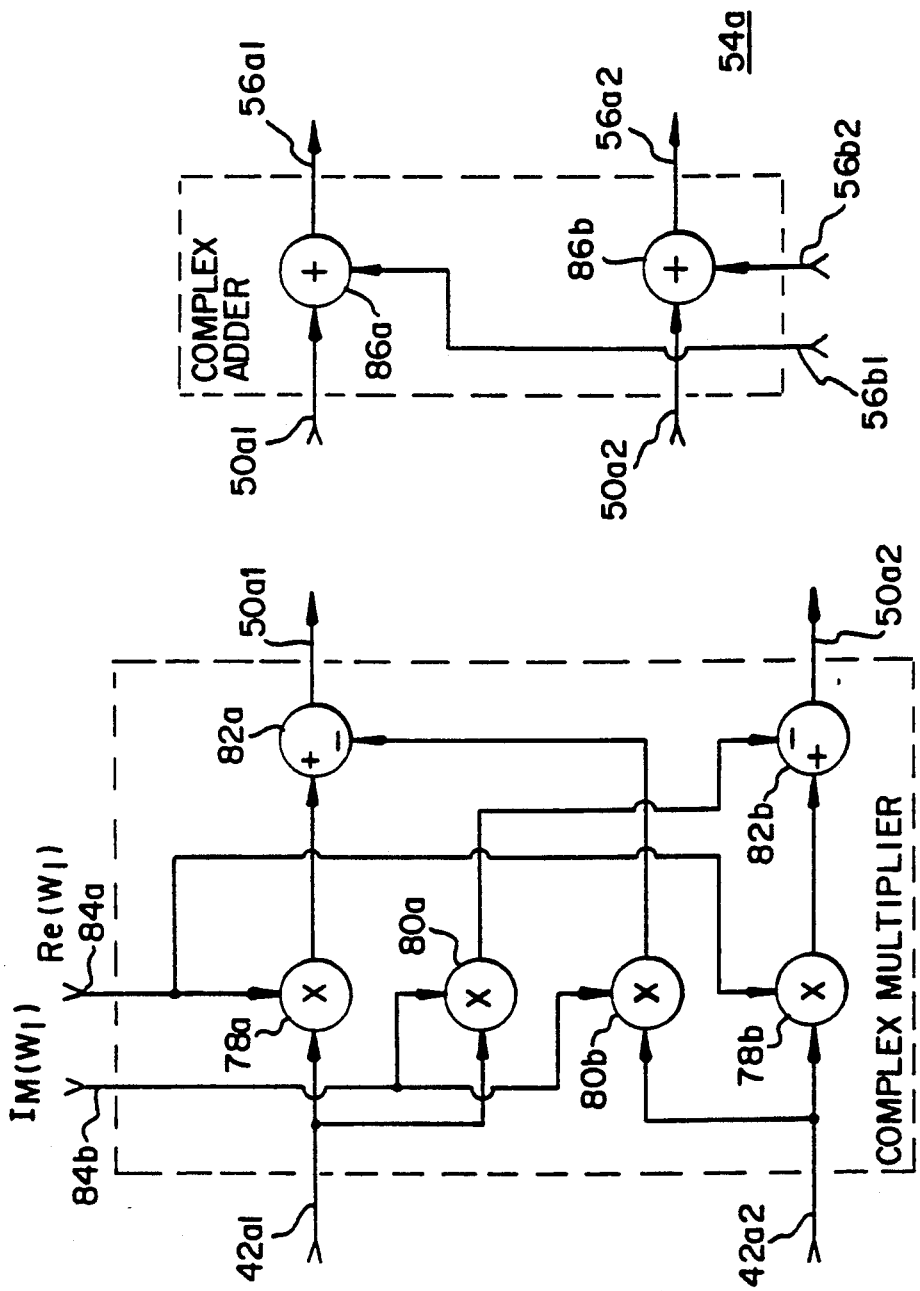

REDUCED HARDWARE ANTENNA BEAMFORMER

BACKGROUND OF THE INVENTION

This invention relates to antenna beamformers for shaping antenna beams, and more particularly to such antenna beam formers capable of providing sidelobe or mainbeam cancellation.

Many modern communication and sensing systems include a plurality of antennas arranged as an array or as a main antenna with auxiliary antennas, arranged for producing a mainbeam with reduced amplitude or suppressed sidelobes, or in some cases with a suppressed mainlobe or portion thereof. For example, a radar system may include a main antenna for forming a narrow beam, which is subject to unwanted signals from the main antenna sidelobes. Auxiliary antennas located near the main antenna may be interconnected therewith for reducing the amount of effective signal intrusion on the sidelobes.

FIG. 1a is a simplified block diagram of a signal receiving system designated generally as 10 which includes a main antenna 12 and a plurality of auxiliary antennas 14a, 14b, ... 14n. Main antenna 12 is connected by way of a diplexer 16 to a transmitter (TX) 18 and to a receiver (RX) 20. Transmitter signals are coupled to antenna 12 by diplexer 16, and received signals are coupled by diplexer 16 to receiver 20. Receiver 20 may perform a number of functions, including bandpass filtering for rejection of unwanted signals lying outside the desired bandpass, and down conversion to an intermediate frequency (IF). The main IF signal is coupled over a path 22 to an analog-to-digital converter (ADC) 24. ADC 24 produces digital signals which are applied over a data path 26 to a digital product detector (DPD) 28. DPD 28, described in more detail below, converts the in-phase (I) and quadrature (Q) components of the main IF signal to baseband or to zero frequency.

Auxiliary antennas 14a, 14b, ... 14n are not coupled to transmitters, and therefore function only in a receiving mode. Each of antennas 14a, 14b, ... 14n is connected to its own receiver, analog-to-digital converter, and digital product detector, so only one such cascade is described. Taking auxiliary antenna 14a as representative, the signals which it receives are coupled over a path 30a to a receiver 32a, which performs the same functions as receiver 20, including bandpass filtering and down conversion to IF on a transmission path 34a. The auxiliary received signal on transmission path 34a is sampled and digitized in ADC 36a to produce sampled, digitized IF signals on data path 38a for application to digital product detector (DPD) 40a. DPD 40a detects the digitized IF signal on data path 38a to produce in-phase signal components on data path 42a1 and quadrature signal components on data path 42a2. Digital product detectors are known, and are described, for example, in U.S. Pat. No. 4,779,054 issued Oct. 18, 1988 in the name of Monteleone et al.

As so far described, the arrangement of FIG. 1a processes the main signal and the auxiliary signals to produce baseband in-phase and quadrature digital signals on data paths 29a and 29b, and in-phase and quadrature sets of auxiliary signals on data path pairs 42a, 42b, ... 42n. The beamforming is accomplished by weighting the in-phase and quadrature components of the main signal on data paths 29a and 29b by the real and imaginary components of a weighting coefficient $W_0$, and by similarly weighting each of the in-phase and quadrature components of the auxiliary baseband signals by the real and imaginary components of a set of weights $W_1$, $W_2$, ... $W_n$, as described in more detail below. The weighted main baseband signals generated in complex multiplier 44 are applied by way of data paths 48a and 48b to a complex adder 52. The weighted in-phase and quadrature components produced by each of multipliers 46a, 46b, ... 46n on data path pairs 50a, 50b, ... 50n, respectively, are applied to complex adding circuits 54a, 54b, ... $54_{n-1}$. There is one less adder 54 than there are multipliers 46 because adder $54_{n-1}$ adds together the outputs from penultimate multiplier $46_{n-1}$ with the output from last multiplier 46n. Complex adder 54a adds together the weighted in-phase and quadrature baseband components from multiplier 46a together with the corresponding components from all of the other multipliers as added together by the remaining complex adders 54b, ... $54_{n-1}$. The in-phase and quadrature components of the weighted baseband auxiliary signals at the output of complex summing circuit 54a are applied as one set of inputs to complex summing circuit 52. Complex summing circuit 52 sums the in-phase and quadrature components of the weighted baseband main signals with the in-phase and quadrature components, respectively, of the weighted baseband auxiliary signals to produce the desired in-phase and quadrature output signals on data paths 58a and 58b. The signals appearing on data paths 58a and 58b represent the signals received by main antenna 12 and auxiliary antennas 14 with nulling or signal suppression in directions controlled by the selection of weights $W_0$, $W_1$, ... $W_n$.

FIG. 1b is a simplified block diagram of a digital product detector (DPD) of FIG. 1a. For definiteness, FIG. 1b represents DPD 28 of FIG. 1a. In FIG. 1b, elements corresponding to those of FIG. 1 are designated by like reference numerals. In FIG. 1b, digitized intermediate-frequency main signals are applied over data path 26 to the common element 60a of a single pole, double throw switch 60. Switch 60 alternates position between terminals 61a and 61b during each clock pulse representing a new signal sample. Thus, a first sample may be applied by switch 60 in the illustrated position to switch terminal 61a, and the next following signal sample is applied to switch terminal 61b. The samples are continuously alternated between terminals 61a and 61b. FIG. 1c illustrates one cycle of intermediate-frequency analog equivalent of the input signal applied to switch 60 of FIG. 1b. In FIG. 1c, digital samples occur at times T0, T1, T2 and T3 for the case in which the sampling clock signal has a frequency of four times the intermediate frequency. Amplitudes $a_0$, $a_1$, $a_2$ and $a_3$ represent the amplitudes of the digital samples which might occur. When applied to alternating switch 60 of FIG. 1b, sample $a_0$ might be applied to switch terminal 61a, in which case sample $a_1$ would be applied to switch terminal 61b, $a_2$ would be applied to switch terminal 61a, and sample $a_3$ would be applied to switch terminal 61b. Thus, samples $a_0$ and $a_2$ are applied to a data path designated generally as 62a in FIG. 1b, while samples $a_1$ and $a_3$ are applied to a channel designated 62b. Channel 62b is identical to channel 62a, so only channel 62a is described in detail.

Samples $a_0$ and $a_2$ of FIG. 1c are applied by way of switch 60 of FIG. 1b to a mixer or multiplier 64a, to which a path-frequency clock signal designated $(-1)$ to the $n^{th}$ power is applied, which simply represents multiplication of the sequential signal samples alternately by +1 and −1, thereby effecting a reversal of amplitude of every other sample. The structure of multiplier 64a is simpler than the structure of a general multiplier, since it is only required to negate or not negate. For example, sample $a_0$ would be multiplied by +1 and negative-amplitude sample $a_2$ would be multiplied by −1, to invert it and thereby produce a signal of unidirectional polarity. Thus, multiplier 64a "detects" the signal to produce a sample representation of a direct voltage, which is applied to a finite impulse response (FIR) filter 66a.

The purpose of FIR filter 66a and 66b can be explained by noting that the sampling of waveform 98 of FIG. 1c occurs at different times for the in-phase and quadrature components. Thus, the amplitudes of the in-phase and quadrature may not be true representations of the relative amplitudes which they would have if they were sampled at the same instant. FIR filters 66a and 66b perform interpolation to effectively "move" the sampling times into congruence, as known in the art. FIR filter 66a includes a delay line which, as illustrated, includes four shift registers (S) 68a, 68b, 68c and 68d, which together provide five sample points 70a, 70b, ... 70e. Each tap 70a, 70b, ... 70e is coupled to an input of a multiplier 72a, 72b, ... 72e. A plurality of fixed or variable weighting signals are applied over a data path 74 to the multipliers 72, for multiplying the mutually delayed signal samples. The interpolation weights $W_I$ may be produced by a ROM, or calculated by an adaptive scheme. The mutually delayed signals, multiplied by interpolation weights, are applied to a summing circuit illustrated as 76, which produces the desired detected in-phase signal on data path 29a. Similarly, channel 62b of FIG. 1b produces on output data path 29b the desired quadrature baseband signal, by use of a different set of FIR weights $W_Q$.

FIG. 1d is a simplified block diagram of a complex multiplier 44 or 46 of FIG. 1a. For definiteness, the arrangement of FIG. 1d represents complex multiplier 46a of FIG. 1a. Elements of FIG. 1d corresponding to those of FIG. 1a are designated by like reference numerals. In FIG. 1d, complex multiplier 46a includes four real multiplier 78a, 78b, 80a and 80b, and two real adders or summing circuits 82a and 82b. In-phase detected auxiliary signals are applied over data path 42a1 to first inputs of multiplier 78a and 80a, and quadrature detected auxiliary signals are applied over path 42a2 to first inputs of real multiplier 78b and 80b. Real components of weighting signal $W_1$ are applied by way of data path 84a to second inputs of multipliers 78a and 78b, while imaginary components of weighting signal $W_1$ are applied by way of data path 84b to second inputs of multipliers 80a and 80b. The weighted signals at the outputs of multipliers 78a and 80b are applied to inputs of a real adder 82a, configured for subtraction of the output of multiplier 80b from the output of multiplier 78a to produce the real component of weighted signal on output data path 50a1, and the outputs of multipliers 78b and 80a are applied to inputs of summing circuit 82b to produce the weighted imaginary signal on data path 50a2.

FIG. 1e is a simplified block diagram of a complex adder 52 or 54 of FIG. 1a. For definiteness, complex adder 54a is illustrated. In FIG. 1e, elements corresponding to those of FIG. 1a are designated by like reference numerals. In FIG. 1e, complex adder 54a includes first and second real adders 86a and 86b. In FIG. 1e, adder 86a sums together the real components of the weighted detected auxiliary signals received over data path 50a1 with the sum of the weighted detected auxiliary signals received over data path 56b1 to produce the sum of all the weighted detected auxiliary signals on data path 56a1. Similarly, adder 86b sums together the imaginary component of the detected auxiliary signal on data path 50a2 with the sum of the imaginary components of the weighted auxiliary signals received over 56b2 to produce the total sum of the imaginary components of the detected auxiliary signals on data path 56a2.

The arrangement of FIG. 1a requires a digital product detector 28 for the main signal path and a plurality of further digital product detectors 40a, 40b, ... 40n, one for each of the auxiliary data paths. In addition, the arrangement of FIG. 1a requires a complex multiplier 44 or 46a, 46b, ... 46n for each of the main and auxiliary data paths. By reference to FIGS. 1b, 1d and 1e, it is easy to see that each of the structures includes a number of real multipliers and summers, and that the overall structure may be quite complex. It would be desirable to reduce the total amount of hardware required to produce the sidelobe-cancelled output signals on data paths 58a and 58b.

SUMMARY OF THE INVENTION

A beamforming system for a main transducer and a plurality of auxiliary transducers includes a plurality of analog-to-digital converters, one for each transducer, for converting the main and auxiliary signals into digital form. A pair of real multipliers is coupled to each of the analog-to-digital converters for multiplying either the main signal or one of the auxiliary signals by real and imaginary components of a weighting signal to thereby create real and imaginary weighted main and auxiliary signals. A pair of real summing circuits is coupled to each pair of real multipliers for summing together the weighted real main signals with the weighted real auxiliary signals to produce real weighted sum signals and imaginary weighted sum signals. A pair of digital product detectors is connected to detect the in-phase and quadrature components of the real weighted sum signals and the imaginary weighted sum signals. A summing circuit is connected to the pair of digital product detectors for subtracting the detected quadrature component of the imaginary weighted sum signal from the detected in-phase component of the real weighted sum signal to produce the in-phase component of the beamformer output. Another summing circuit adds the detected in-phase component of the imaginary weighted sum signal to the quadrature component of the real weighted sum signal to produce the quadrature component of the beamformer output.

DESCRIPTION OF THE DRAWING

FIG. 1d is a simplified block diagram of a complex multiplier which may be used in the arrangement of FIG. 1a, and FIG. 1e is a simplified block diagram of a complex adder which may be used in the arrangement of FIG. 1a.

DESCRIPTION OF THE INVENTION

Figure 1A:
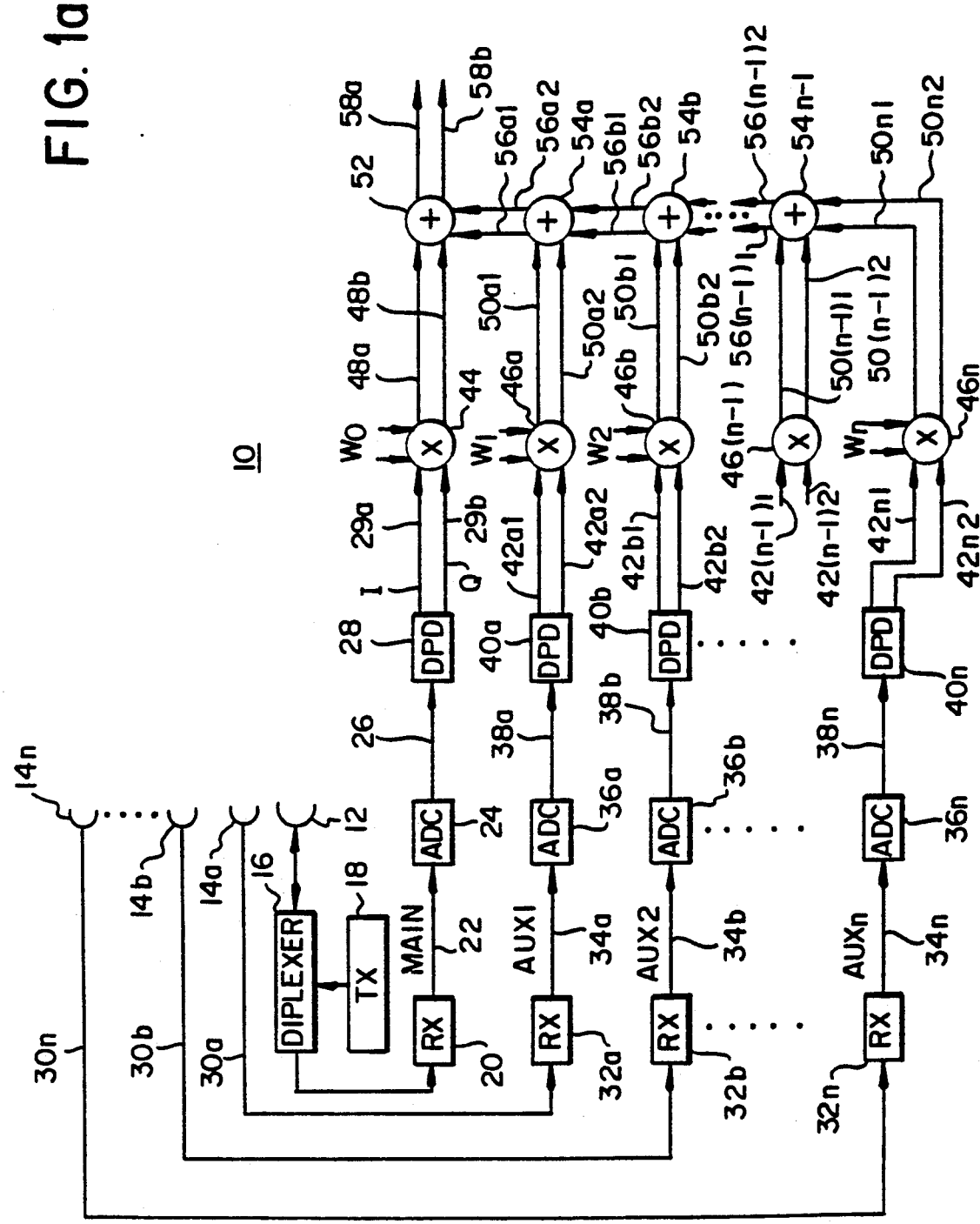
FIG. 1a is a simplified block diagram of a beamforming arrangement using a main antenna and auxiliary antennas.
Figure 2:
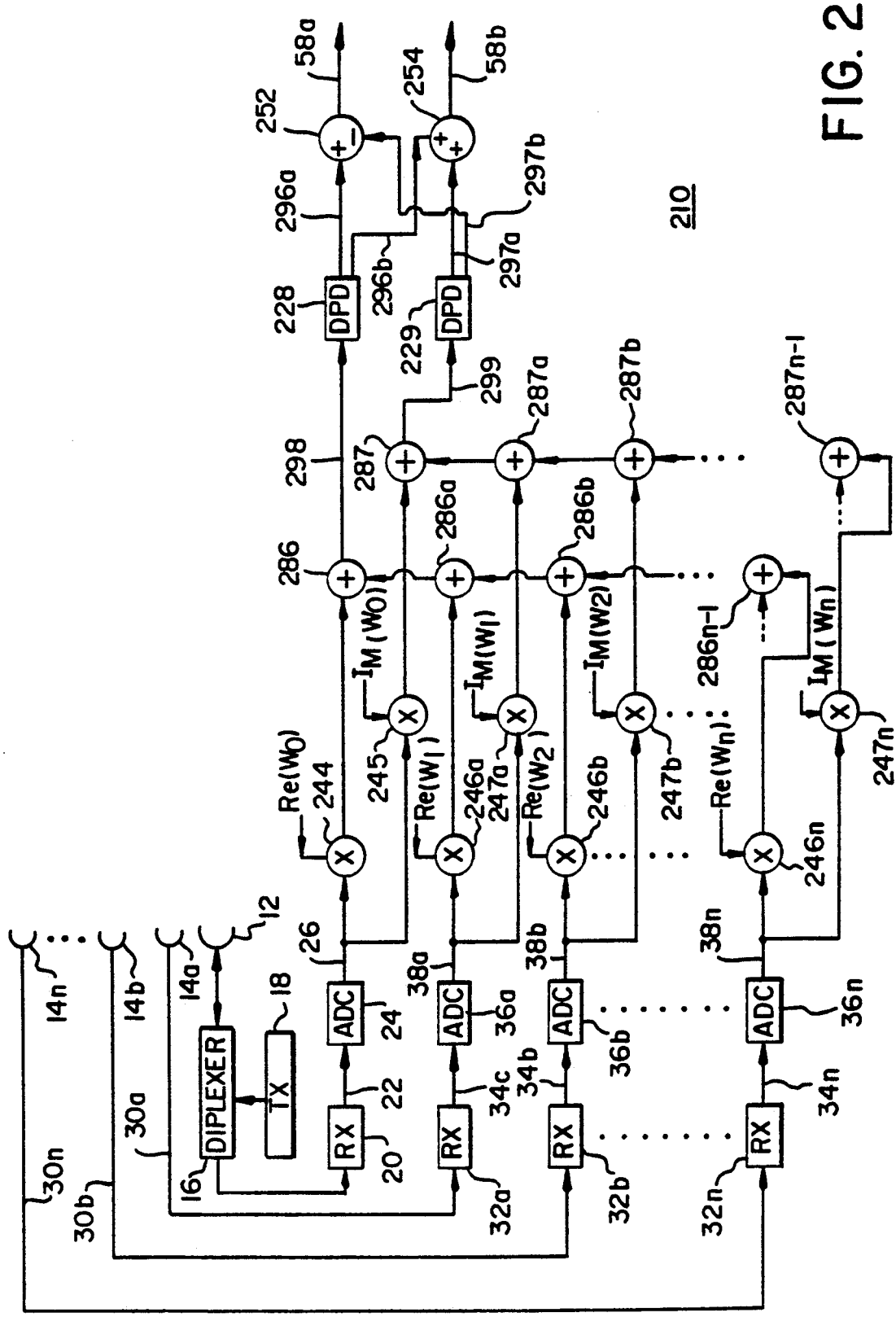
FIG. 2 is a simplified block diagram of a beamformer in accordance with the invention.

FIG. 2 is a simplified block diagram of a beamformer in accordance with the invention. Elements of FIG. 2 corresponding to those of FIG. 1a are designated by like reference numerals. In FIG. 2, the structure is identical to that of FIG. 1a from antennas 12 and 14 through ADC 24 and 36. Thus, in FIG. 2 as in FIG. 1a sampled, digitized intermediate-frequency main signal appears on a data path 26 at the output of ADC 24, and sampled, digitized intermediate-frequency auxiliary signals appear on data paths 38a, 38b, ... 38n at the outputs of ADC 36a, 36b, ... 36n, respectively.

In FIG. 2, the sampled digitized intermediate-frequency main signal on data path 26 is applied to first inputs of real multipliers 244 and 245, which receive at their second input ports the real and imaginary portions, respectively, of a weighting coefficient $W_0$. Similarly, each of the sampled, digitized intermediate frequency auxiliary signals on each data path 38 is applied to first input ports of a pair of real multipliers for multiplication by the real and imaginary portions of a weighting coefficient (W). For example, the sampled, digitized intermediate-frequency auxiliary signal on data path 38a is applied to input ports of real multipliers 246a and 247a, which receive at their second input ports the real and imaginary portions of weighting coefficient $W_1$. Similarly, the sampled, digitized intermediate-frequency auxiliary signal on data path 38b is applied to first input ports of real multipliers 246b and 247b, in which they are multiplied by the real and imaginary components of weighting coefficient $W_2$.

The weighted main signal at the output of multiplier 244 is applied to an input of real summing circuit 286, where it is added to the correspondingly weighted portions of all the auxiliary signals, summed together by real summing circuits 286a, 286b, ... $286_{n-1}$. Similarly, the weighted portion of the main signal produced at the output of multiplying circuit 245 is summed in summing circuit 287 with the sum of all the correspondingly weighted auxiliary signals, which are summed together by real summing circuits 287a, 287b, ... $287_{n-1}$. The summed weighted output signal from real summing circuit 286 is applied over a data path 298 to a digital product detector 228. The summed, weighted composite signals produced at the output of summing circuit 287 are applied by way of a data path 299 to a second digital product detector 229.

Figure 1B:
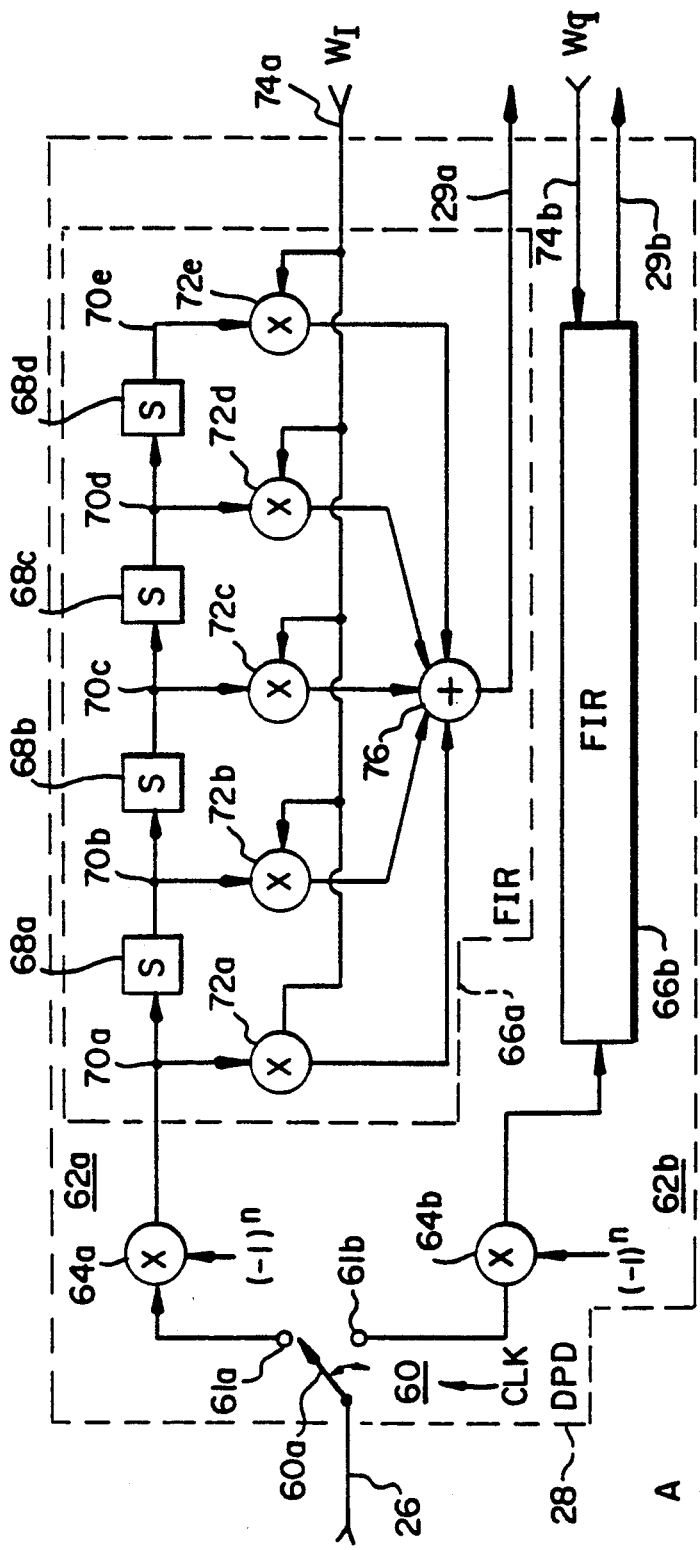
FIG. 1b is a simplified block diagram of a digital product detector which may be used in the arrangement of FIG. 1a, FIG. 1c is an amplitude-versus-time plot of a signal which may be applied to the digital product detector of FIG. 1b.
Figure 1C:
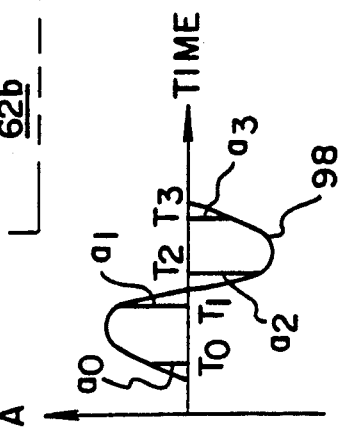

Digital product detectors 228 and 229 receive, at their input ports, sampled and digitized intermediate-frequency signals, just as in the case of FIG. 1b. Digital product detectors 228 and 229 detect and interpolate as described in conjunction with FIG. 1b, to produce an in-phase component of the signal on path 298 on data path 296a, and a quadrature component on data path 296b. Digital product detector 229 produces an in-phase component of the signal on path 299 on data path 297a, and a quadrature component on data path 297b. The in-phase component on data path 296a is applied to the non-inverting (+) input port of a summing circuit 252, and the quadrature component on data path 297b is applied to the inverting (−) input port of summing circuit 252, to produce on data path 58a the in-phase component of the beamformer output signal. The in-phase component on data path 297a is applied to a first non-inverting input port of a summing circuit 254, and the quadrature component on data path 296b is applied to a second non-inverting input port of a summing circuit 254 to produce the desired quadrature component of the beamformer output signal on data path 58b.

Thus, the structure of FIG. 2 produces the identical signal on data paths 58a and 58b as does the structure of FIG. 1a. However, the structure of FIG. 2 includes only two digital product detectors, rather than one for each of the main and auxiliary signals. Also, instead of the complex multipliers used for each channel in FIG. 1a, the arrangement of FIG. 2 uses a pair of real multipliers. Taken as a whole, this results in a significant reduction in the amount of hardware required to perform the required signal processing. For a particular radar system, a total hardware reduction of about 40% was projected by use of the invention.

Other embodiments of the invention will be apparent to those skilled in the art. For example, analog or digital processing, or an intermixture thereof, may be used as required, and in particular, the ADCs of FIG. 2 may precede the receivers (RX) if the receivers are digital.

What is claimed is:

1. A beamforming system, comprising:

a main transducing means for producing a main beam in a main beam direction, and for transducing desired signals received from said main beam direction and undesired signals received from other directions, for producing main signals;

a plurality of auxiliary transducing means located in the vicinity of said main transducing means, for transducing signals received from said other directions, for producing auxiliary signals;

a plurality of analog-to-digital converting means, each of said analog-to-digital converting means being coupled to a different one of said main transducing means and said auxiliary transducing means, for converting said main and auxiliary signals into sampled digital main and digital auxiliary signals, respectively;

a pair of real multiplying means coupled to each of said analog-to-digital converting means, each said pair including first and second real multiplying means, said first real multiplying means of each pair including a real weighting coefficient input port, and said second real multiplying means of each pair including an imaginary weighting coefficient input port, for multiplying one of said digital main signals and said digital auxiliary signals by real and imaginary weighting coefficients applied to said real and imaginary weighting coefficient input ports, respectively, for producing weighted real main signals and weighted imaginary main signals from said real multiplying means of a first one of said pairs, and for producing weighted real auxiliary signals and weighted imaginary auxiliary signals from said real multiplying means of all others of said pairs;

first and second summing means coupled to said pairs of real multiplying means, for summing said weighted real main signals with said weighted real auxiliary signals to produce real weighted summed signals, and for summing said weighted imaginary main signals with said weighted imaginary auxiliary signals to produce imaginary weighted summed signals;

first digital product detection means coupled to said first summing means, and second digital product detection means coupled to said second summing means, said first and second digital product detection means operating on said real and imaginary weighted summed signals, respectively, each of said digital product detection means recurrently selecting, from among said time-sequential signal samples, first and second pairs of alternate samples, said samples of said first and second pairs being unique to a single pair, for, within each of said input signal sample pairs so selected, reversing the sign of every other sample, to thereby cause each of said pairs of said samples to represent sampled direct signals, and for interpolating each of said sampled direct signals to produce samples representing corresponding times, whereby said first digital product detection means produces in-phase and quadrature components of real detected signals, and said second digital product detection means produces in-phase and quadrature components of imaginary detected signals; and third summing means coupled to said first and second digital product detection means, for subtracting said quadrature components of said imaginary detected signals from said in-phase components of said real detected signals to produce in-phase cancelled signals in which the effects of said signals to said other directions are reduced, and for adding said quadrature components of said real detected signals to said in-phase components of said imaginary detected signals to produce quadrature cancelled signals in which the effects of said signals from said other directions are reduced.

2. A method for producing a sidelobe suppressed beam, comprising the steps of:

transducing main signals from a preferred direction, said main signals being contaminated with unwanted signals from directions other than said preferred direction;

transducing a plurality of auxiliary signals, including components from said preferred direction and from said directions other than said preferred direction;

converting said main signals to digital form to produce digital main signals;

converting each of said auxiliary signals to digital form, to produce a plurality of digital auxiliary signals;

replicating each of said digital main and auxiliary signals to produce first and second copies of each;

performing a real multiplication of each of said first and second copies of said digital real and digital auxiliary signals by real and imaginary components, respectively, of a weight, to produce weighted digital real signals and weighted digital imaginary signals;

generating weights for said step of real multiplication, said weights being selected so that said first and second copies of each of said signals, when multiplied by said weights, result in said weighted digital real signals being orthogonal to corresponding ones of said weighted digital imaginary signals;

summing together said weighted digital real signals to produce real bandpass signals;

summing together said weighted digital imaginary signals to produce imaginary bandpass signals;

digitally product detecting said digital real bandpass signals to produce in-phase and quadrature real detected signals;

digitally product detecting said digital imaginary bandpass signals to produce in-phase and quadrature imaginary detected signals;

subtracting said quadrature imaginary detected signals from said in-phase real detected signals to produce first output signals in which said unwanted signals are suppressed; and adding said quadrature real detected signal to said in-phase imaginary detected signal to produce second output signals, orthogonal to said first output signals, in which said unwanted signals are suppressed.

* * * * *